W. N. KETCHUM.
GLOVE MEASURING DEVICE.
APPLICATION FILED MAR. 4, 1908.
933,992.
Patented Sept. 14, 1909.
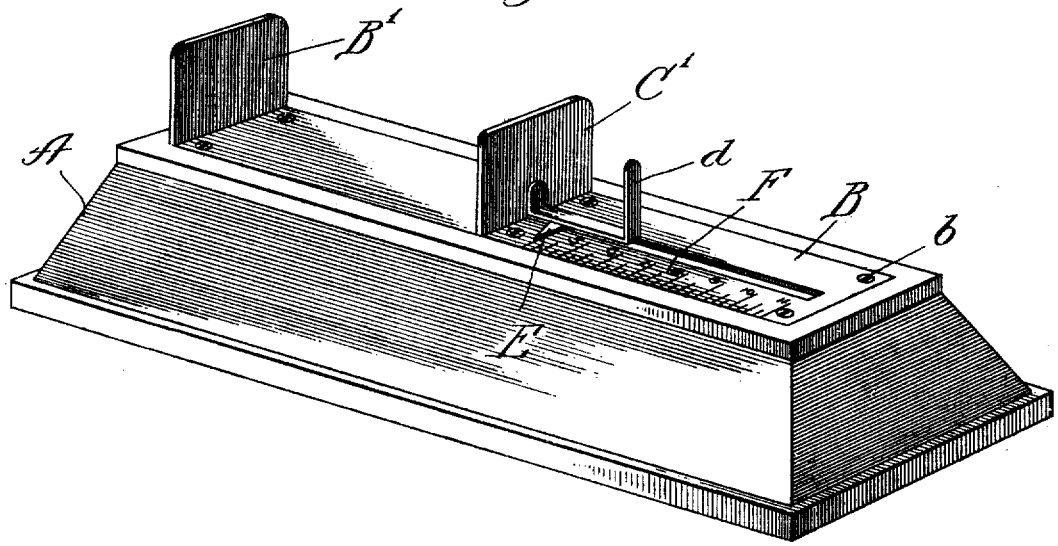
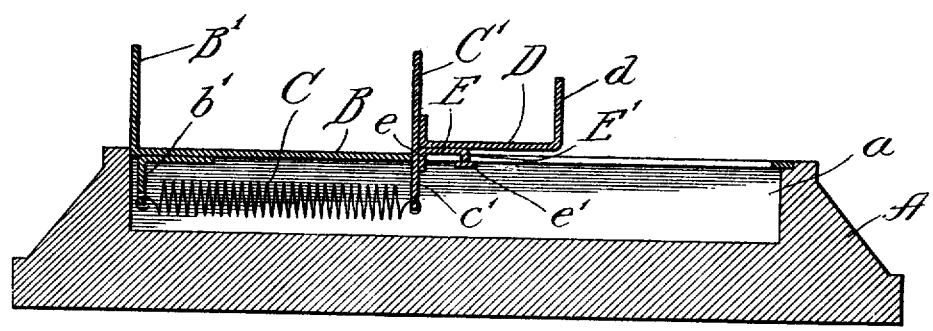
Witnesses:
John Enders
Chas. H. Buell
Inventor:
William N. Ketchum.
By Sheridan & Wilkinson
Attys.

UNITED STATES PATENT OFFICE.

WILLIAM N. KETCHUM, OF SANTA MONICA, CALIFORNIA.

GLOVE-MEASURING DEVICE.

933,992.

Specification of Letters Patent. Patented Sept. 14, 1909.

Application filed March 4, 1908. Serial No. 419,144.

*To all whom it may concern:*

Be it known that I, WILLIAM N. KETCHUM, a citizen of the United States, residing at Santa Monica, in the county of Los Angeles and State of California, have invented certain new and useful Improvements in Glove-Measuring Devices, of which the following is a specification.

My invention relates in general to measuring instruments, and more particularly to a device for measuring the width of a hand and indicating the size of a glove to fit the same.

It is customary in ascertaining the size of glove required by a hand to place a tape around the hand, the size of the glove required being indicated by graduations on the tape. This method requires a careful adjustment, and is objectionable, as tape stretches with usage, thereby rendering the measurement inaccurate. Moreover, the measurement is rendered uncertain, as the measurer at times will draw the tape tighter around the hand than at others.

The primary object of my invention is to provide a measuring device particularly adapted for determining the sizes of gloves which will fit the hands of customers, which will be simple in construction, inexpensive in manufacture, convenient in use, and accurate in operation.

The form of my invention herein disclosed may be generally described as comprising a base adapted to be supported upon a counter, two abutments mounted upon the base, one fixed and the other movable, a spring, the tension of which tends to move one abutment toward the other, and a device actuated by the movable abutment for indicating the size of the glove to fit a hand interposed between the abutments.

My invention will be more fully hereinafter described with reference to the accompanying drawing, in which the same is illustrated as embodied in a convenient and practical device, and in which—

Figure 1 is a perspective view; and Fig. 2 a central longitudinal section.

The same reference characters are used to designate the same parts in the two figures of the drawings.

Reference letter A indicates a supporting base which may be of any desired size and made of any suitable material, as, for instance, wood. The base is preferably of a size adapted to rest upon the counter in a store, or upon a table. A longitudinal central chamber $a$ is provided in the base and extends upwardly to the top plane thereof.

B designates a plate, preferably formed of metal, which is secured upon the top surface of the base and overlies the chamber therein. Suitable fastening devices, such, for instance, as screws $b$, are provided for fastening the plate to the base. Projecting upwardly from the base and rigidly secured thereto is a shoulder or abutment $B'$, which may be formed by bending upwardly one end of the plate B.

$C'$ indicates a movable shoulder or abutment, which is mounted upon the base and is adapted to move toward or away from the fixed abutment $B'$. The abutment $C'$ is provided with a downwardly extending lug $c'$, which projects through a slot formed in the plate B.

A spring is provided within the chamber $a$, the tension of which tends to move the abutment $C'$ toward the abutment $B'$, such spring being preferably located, as indicated by the reference character C, between the lug $c'$ and the lug $b'$ depending from the plate adjacent the fixed abutment $B'$. The opposite ends of the spring are secured to the lugs between which it is interposed.

A handle D is secured to the movable abutment $C'$, such handle being preferably provided with an upwardly projecting portion $d$, which may be readily grasped and pressure exerted thereon to move the abutment $C'$ against the tension of the spring C and away from the fixed abutment.

E indicates a pointer carried by the movable abutment $C'$ and overlying a scale F formed upon the plate B adjacent the slot therethrough. The pointer E may be secured to the movable abutment in any suitable manner, as, for instance, by providing a lug $e$, which extends downwardly through the slot in the plate and is riveted or otherwise attached to the lug $c'$ of the abutment.

As is well-known the sizes of gloves correspond to the circumferences of the hands and it is, therefore, necessary in determining the size of gloves for a given hand to ascertain the circumference of such hand. The scale F therefore comprises graduations indicating the circumferences of hands of the widths determined by the positions of the movable abutment relatively to the fixed abutment.

In order to insure the free sliding of the movable abutment, a lug E' is preferably provided, which may be conveniently formed integral with the pointer, such lug extending through the slot and being provided with a head e' underlying the plate B and extending at both sides of the slot therethrough.

The manner of using my improved measuring device will readily be understood from the foregoing description, and is briefly as follows: The slot in the plate terminates a distance from the fixed abutment corresponding to the smallest size of hand, so that the movable abutment normally occupies a position by reason of the tension of the spring C a fixed distance away from the abutment B', such distance being the minimum size of the glove. In order to measure the width of a hand, the movable abutment C' is drawn away from the fixed abutment by applying a pull upon the handle D, thereby forming a space between the abutments to permit the hand to be placed, the hand at one side resting against the fixed abutment. The pull upon the handle is discontinued, thereby permitting the spring to draw the movable abutment into contact with the hand. The pointer then indicates upon the scale the size of the glove required by the measured hand. It is, therefore, evident that in the use of my invention the position of the movable abutment is determined by the width of the hand interposed between the abutments, but the pointer does not indicate on the scale the width of the hand but the circumference of a hand having a width equal to the distance between the abutments. By my invention it is consequently possible by merely placing the hand between two abutments having a very limited relative movement to determine the circumference of such hand, whereas heretofore it has been necessary that a measuring tape should be employed of a length sufficient to surround a hand in order to accurately measure the circumference thereof, and thereby determine the proper size of glove.

From the foregoing description it will be observed that I have invented an improved device for determining the size of gloves required for various sizes of hands, which is simple in use and enables the measurement to be quickly made, and which is accurate, as there are no parts to stretch by usage, and especially as the spring produces a substantially uniform pressure of the movable abutment against the hand, thereby obviating the inaccuracies incident to a hand operated measuring device.

I claim:—

1. In a measuring device for hands to determine the size of gloves therefor, the combination with a base, of a fixed abutment, a movable abutment provided with indicating means, and a scale upon such base adjacent the path of movement of said indicating means, said scale having thereon graduations indicating the circumference of a hand interposed between the abutments.

2. In a measuring device for hands to determine the size of gloves therefor, the combination with a base, of a fixed abutment, a movable abutment provided with indicating means, a spring, the tension of which draws the movable abutment toward the fixed abutment, and a scale upon such base adjacent the path of movement of said indicating means, said scale having thereon graduations indicating the circumference of a hand interposed between the abutments.

In testimony whereof, I have subscribed my name.

WILLIAM N. KETCHUM.

Witnesses:
 Geo. L. Wilkinson,
 Annie C. Courtenay.